(12) United States Patent
Luo et al.

(10) Patent No.: US 10,638,486 B2
(45) Date of Patent: Apr. 28, 2020

(54) METHOD AND DEVICE FOR RESOURCE ALLOCATION

(71) Applicant: ZTE Corporation, Shenzhen (CN)

(72) Inventors: Wei Luo, Shenzhen (CN); Lin Chen, Shenzhen (CN); Yuqin Chen, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 109 days.

(21) Appl. No.: 15/571,594

(22) PCT Filed: Oct. 16, 2015

(86) PCT No.: PCT/CN2015/092119
§ 371 (c)(1),
(2) Date: Nov. 3, 2017

(87) PCT Pub. No.: WO2016/176965
PCT Pub. Date: Nov. 10, 2016

(65) Prior Publication Data
US 2018/0160418 A1    Jun. 7, 2018

(30) Foreign Application Priority Data
May 5, 2015 (CN) .......................... 2015 1 0225109

(51) Int. Cl.
*H04W 72/04* (2009.01)
*H04W 72/12* (2009.01)
(Continued)

(52) U.S. Cl.
CPC ......... *H04W 72/048* (2013.01); *H04W 72/04* (2013.01); *H04W 72/1263* (2013.01); *H04W 4/40* (2018.02); *H04W 72/10* (2013.01)

(58) Field of Classification Search
CPC ........... H04W 72/048; H04W 72/1263; H04W 72/04; H04W 72/10; H04W 4/40
See application file for complete search history.

(56) References Cited

U.S. PATENT DOCUMENTS

| 2011/0134774 A1* | 6/2011 | Pelletier | H04W 52/365 |
| | | | 370/252 |
| 2011/0153166 A1* | 6/2011 | Yester | B60K 35/00 |
| | | | 701/45 |

(Continued)

FOREIGN PATENT DOCUMENTS

| CN | 101621457 A | 1/2010 |
| CN | 102325377 A | 1/2012 |

(Continued)

OTHER PUBLICATIONS

Supplementary European Search Report in European application No. 15891213.9, dated Apr. 11, 2018, 9 pgs.

(Continued)

*Primary Examiner* — Hashim S Bhatti
(74) *Attorney, Agent, or Firm* — Cantor Colburn LLP

(57) ABSTRACT

A method and device for resource allocation. The method comprises: transmitting to a user equipment (UE) resource allocation information used for transmitting specific service data, where the resource allocation information comprises at least one among the following pieces of information: semi-persistent scheduling resource information, preconfigured resource information, and transmission resource pool information. The described technical solution allows the UE to rapidly acquire a radio resource for transmitting the specific service data and, compared with the prior art, greatly reduces communication latency.

25 Claims, 11 Drawing Sheets

(51) Int. Cl.
*H04W 4/40* (2018.01)
*H04W 72/10* (2009.01)

(56) References Cited

U.S. PATENT DOCUMENTS

| | | |
|---|---|---|
| 2013/0163536 A1 | 6/2013 | Anderson et al. |
| 2013/0279491 A1* | 10/2013 | Rubin .................... G08G 1/166 370/347 |
| 2014/0044029 A1* | 2/2014 | Chou ................ H04W 52/0212 370/311 |
| 2014/0105125 A1* | 4/2014 | Chaponniere ......... H04W 76/32 370/329 |
| 2014/0328329 A1 | 11/2014 | Novlan et al. |
| 2015/0126191 A1* | 5/2015 | Yajima .................. H04W 36/08 455/436 |
| 2015/0230273 A1* | 8/2015 | Guo .................. H04W 72/0413 370/329 |
| 2015/0245193 A1* | 8/2015 | Xiong ...................... H04W 4/80 370/328 |
| 2016/0055745 A1* | 2/2016 | Karacan ................ H04W 4/046 701/117 |
| 2016/0183167 A1 | 6/2016 | Agiwal et al. |
| 2016/0212596 A1 | 7/2016 | Brahmi et al. |
| 2016/0295589 A1* | 10/2016 | Nikopour .............. H04W 4/023 |
| 2016/0381539 A1* | 12/2016 | Park ........................ H04W 4/90 455/404.2 |
| 2017/0006582 A1* | 1/2017 | Jung ..................... H04W 72/02 |
| 2017/0019812 A1* | 1/2017 | Lee ....................... H04W 76/14 |
| 2017/0295567 A1* | 10/2017 | Chen ..................... H04W 76/11 |
| 2018/0049088 A1* | 2/2018 | Shiga ........................ G08G 1/09 |
| 2018/0077668 A1* | 3/2018 | Chun .................... H04W 4/046 |

FOREIGN PATENT DOCUMENTS

| | | |
|---|---|---|
| CN | 102769879 A | 11/2012 |
| CN | 103535099 A | 1/2014 |
| CN | 103765971 A | 4/2014 |
| CN | 104254129 A | 12/2014 |
| CN | 104811892 A | 7/2015 |
| WO | 2015020231 A1 | 2/2015 |
| WO | 2015020448 A1 | 2/2015 |
| WO | 2015032436 A1 | 3/2015 |

OTHER PUBLICATIONS

KDDI: "Views on Discovery Resource Allocation", Feb. 2014, 3GPP TSG RAN WG1 Meeing #76; Discovery ,3rd Generation Partnership Project, Mobile Competence Centre, 650 Route Des Lucioles; F-06921, Sophia -Antipolic Cedes; France Vo. 1, Ran WG1, No. Prague, Czech; Retrieved from the Internet:URL:http://www.3gpp.org/ftp/Meetjngs 3GPP_SYNC/RAN/RAN1/Docs/, 4 pgs.
International Search Report in international application No. PCT/CN2015/092119, dated Feb. 27, 2016, 2 pgs.
English Translation of the Written Opinion of the International Search Authority in international application No. PCT/CN2015/092119, dated Jan. 21, 2016, 6 pgs.

* cited by examiner

METHOD AND DEVICE FOR RESOURCE ALLOCATION

TECHNICAL FIELD

The disclosure relates to, but not limited to, the technical field of wireless communications, and in particular to a resource allocation method and device.

BACKGROUND

With the development of wireless multimedia services, demands of people for high data rate and user experience are increasing, so as to make higher requirements for system capacity and coverage of a traditional cellular network. In addition, application scenarios of public security, social networking, near field data sharing, local advertising and the like enable demands of people, for knowing people or things nearby and communicating therewith (proximity services), to gradually increase. A traditional base station-centered cellular network has obvious limitations to high data rate and supporting of the proximity services, and under this demand background, a Device-to-Device (D2D) (i.e., device direct-through) technology representative of a new development direction of future communication technologies emerges. Application of the D2D technology can alleviate burdens on the cellular network, reduce the power consumption of a battery of a User Equipment (UE), increase the data rate, improve the robustness of network infrastructure, and well meet requirements for the above-mentioned high data rate services and proximity services.

The D2D technology can work at a licensed band or an unlicensed band to allow a plurality of D2D UEs supporting a D2D function to perform direct discovery/direct communication in the presence of network infrastructure or in the absence of network infrastructure. There are mainly three D2D application scenarios as follows.

UE1 and UE2 perform data interaction under the coverage of a cellular network, and user plane data does not pass through network infrastructure, as shown in Mode 1 in FIG. 1.

A UE in a weakly covering/coverless area performs relayed transmission, as shown in Mode 2 in FIG. 1. UE4 with poor signal quality is allowed to communicate with a network via proximal UE3 covered by the network, and coverage expansion and capacity improvement of an operator can be assisted.

When an earthquake or an emergency occurs and a cellular network cannot normally work, inter-device direct communication is allowed, as shown in Mode 3 in FIG. 1. Control planes and user planes among UE5, UE6 and UE7 perform one-hop or multi-hop data communication without passing through network infrastructure.

The D2D technology usually includes a D2D discovery technology and a D2D communication technology, herein the D2D discovery technology refers to a technology for judging/determining whether a first UE is proximal to a second UE. Usually, D2D UEs may discover each other by transmitting or receiving discovery signals/information. The D2D communication technology refers to a technology of direct communication in a manner that some or all items of communication data between the D2D UEs may not pass through network infrastructure.

On the basis of the above features and advantages of the D2D technology, the related art has been possible to use cellular wireless communication and D2D technologies so as to achieve vehicle networking applications, and main scenarios supporting communications include instant communication and vehicle warning.

As for the vehicle warning, an investigation report from the US National Highway Traffic Safety Administration shows that 80% of highway traffic accidents are caused by negligence of drivers within 3 s before the accidents occur. An experiment of Daimler-Benz shows that if drivers are warned ahead of 0.5 s, 60% of rear-end collisions can be avoided; and if drivers can be warned ahead of 1.5 s and take measures, 90% of rear-end collisions can be avoided. A communication-based collision warning system achieves real-time information interaction between vehicles and between a vehicle and roadside infrastructure by using an advanced wireless cellular communication technology, informs each other of a current state (including position, speed, acceleration and driving path of vehicle) and obtained road environment information, cooperatively senses a road danger situation, provides multiple pieces of collision warning information in time, prevents occurrence of highway traffic safety accidents, and becomes a new idea of attempting to solve the problem of highway traffic safety for each country at present.

The vehicle warning may probably include collision warning, lane change warning and the like. However, delays are highly required under this scenario, and the related D2D technology cannot be achieved.

For some other items of service data needing to be transmitted with low delays, a special resource allocation mechanism for transmitting service data is not designed in the related art. According to the related resource allocation manner, delays for transmitting low-delay data cannot meet real-time demands.

SUMMARY

The following is a brief introduction for a subject described herein in detail. The brief introduction is not intended to restrict the scope of protection of claims.

The embodiments of the disclosure provide a resource allocation method and device, used to solve the technical problem about how to enable a UE to rapidly obtain a radio resource to transmit specific service data.

The embodiment of the disclosure provides a resource allocation method. The method includes the step as follows.

Resource allocation information for transmitting specific service data is transmitted to a UE, herein the resource allocation information includes at least one of the following:

Semi-persistent Schedule (SPS) resource information, preconfigured resource information and transmission resource pool information.

Alternatively, the operation that resource allocation information for transmitting specific service data is transmitted to a UE includes:

the resource allocation information is transmitted via a broadcast message or Radio Resource Control (RRC) specific signaling.

Alternatively, the specific service data includes one or more of the following data packets:

a data packet with a delay requirement lower than a given threshold;

a data packet with a Guaranteed Bit Rate (GBR) type;

a data packet with a GBR type and with a delay requirement lower than a given threshold;

a data packet with an emergency service type;

a Vehicle to Everything (V2X) data packet;

a V2X data packet with a delay requirement lower than a given threshold;

a data packet with an indicated service type; and a data packet with an indicated V2X service type.

Alternatively, the method further includes the steps as follows.

When the resource type of the specific service data packet is an indicated service type, specific service type indication information is transmitted to the UE; and when the resource type of the specific service data packet is an indicated V2X service type, specific V2X service type indication information is transmitted to the UE, herein the specific service type indication information and the specific V2X service type indication information are used to indicate a service type of the data packet.

Alternatively, the SPS resource information includes one or more of the following:

service type indication information, resource pool priority indication information, and timer expiry threshold.

Alternatively, the preconfigured resource information includes one or more of the following:

resource period, resource subframe offset, resource frequency domain indicator, resource frequency domain configuration index, resource time domain indicator, resource time domain configuration index, transmitting power configuration information, resource pool priority indication information, preconfigured resource identification information, and timer expiry threshold.

Alternatively, the transmission resource pool information includes one or more of the following:

service type indication information, resource pool priority indication information, and timer expiry threshold.

Alternatively, the method further includes the step as follows.

Resource request information reported by the UE for specific service data is received.

Alternatively, the step that resource request information reported by the UE for specific service data is received includes:

resource request information reported by the UE for specific service data is received when a resource activation condition is satisfied.

Alternatively, the resource activation condition includes one or more of the following conditions:

a distance between adjacent vehicles is smaller than a first threshold, a moving speed is greater than a second threshold, an acceleration is greater than a third threshold, a vehicle is to be steered to another lane and to go around a corner, or the vehicle enters a hotspot region, herein the first threshold, the second threshold and the third threshold are transmitted via broadcast signaling and/or RRC dedicated signaling, or preconfigured by a protocol.

Alternatively, the method further includes the step as follows.

Resource release request information reported by the UE for specific service data is received.

Alternatively, the step that resource release request information reported by the UE for specific service data is received includes:

resource release request information reported by the UE for specific service data is received when a resource release condition is satisfied.

Alternatively, the resource release condition includes one or more of the following conditions:

a distance between vehicles is greater than a fourth threshold, a moving speed is smaller than a fifth threshold, an acceleration is smaller than a sixth threshold, and a vehicle leaves a hotspot region, herein the fourth threshold, the fifth threshold and the sixth threshold are transmitted via broadcast signaling and/or RRC dedicated signaling, or preconfigured by a protocol.

Alternatively, the method further includes the step as follows.

A shortest time threshold for state transition is transmitted to the UE, the shortest time threshold being used to indicate, to the UE, a shortest time interval between activation of a resource for transmitting specific service data and release of the resource for transmitting specific service data.

Alternatively, the method further includes the step as follows.

State information reported by the UE is received.

Alternatively, the operation that state information reported by the UE is received includes:

state information reported by the UE via RRC dedicated signaling or a physical uplink control channel is received, herein the state information reported by the UE includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

Alternatively, the method further includes the steps as follows.

Before the state information reported by the UE is received, period configuration information is transmitted, the period configuration information being used to indicate a period where the UE reports the state information; and/or a state change threshold is transmitted, the state change threshold being used to indicate that the UE reports the state information when a state change of the UE exceeds the state change threshold.

Alternatively, the method further includes the step as follows.

The resource for transmitting specific service data is activated or released.

Alternatively, activating a preconfigured resource for transmitting specific service data includes:

transmitting preconfigured resource activation signaling, including:

scrambling a physical downlink control channel via a preconfigured resource Cell Radio Network Temporary Identifier (C-RNTI) so as to indicate activation of a preconfigured resource; or scrambling a physical downlink control channel via an SPS resource C-RNTI to activate an SPS resource, and transmitting indication information for indicating activation of the SPS resource.

Alternatively, releasing a preconfigured resource for transmitting specific service data includes:

transmitting preconfigured resource release signaling, including:

scrambling a physical downlink control channel via a preconfigured resource C-RNTI so as to indicate release of a preconfigured resource; or scrambling a physical downlink control channel via an SPS resource C-RNTI to activate an SPS resource, and transmitting indication information for indicating release of the SPS resource.

Alternatively, a resource allocation information transmitting module is configured to transmit resource allocation information for transmitting specific service data to a UE, and a resource allocation information storage module is configured to store the resource allocation information, herein the resource allocation information includes at least one of the following:

SPS resource information, preconfigured resource information and transmission resource pool information.

Alternatively, the resource allocation information transmitting module is configured to transmit the resource allocation information to the UE in the following manner:

transmitting the resource allocation information via a broadcast message or RRC dedicated signaling.

Alternatively, the SPS resource information includes one or more of the following: service type indication information, resource pool priority indication information, and timer expiry threshold.

Alternatively, the preconfigured resource information includes one or more of the following: resource period, resource subframe offset, resource frequency domain indicator, resource frequency domain configuration index, resource time domain indicator, resource time domain configuration index, transmitting power configuration information, resource pool priority indication information, preconfigured resource identification information, and timer expiry threshold.

Alternatively, the transmission resource pool information includes one or more of the following: service type indication information, resource pool priority indication information, and timer expiry threshold.

Alternatively, the method further includes:

a resource request information receiving module, configured to receive resource request information reported by the UE for specific service data.

Alternatively, the resource request information receiving module is configured to receive the resource request information reported by the UE for specific service data in the following manner:

receiving resource request information reported by the UE for specific service data when a resource activation condition is satisfied.

Alternatively, the resource activation condition includes one or more of the following conditions: a distance between vehicles is smaller than a first threshold, a moving speed is greater than a second threshold, an acceleration is greater than a third threshold, a vehicle is to be steered to another lane and to go around a corner, or the vehicle enters a hotspot region, herein the first threshold, the second threshold and the third threshold are transmitted via broadcast signaling and/or RRC dedicated signaling, or preconfigured by a protocol.

Alternatively, the method further includes:

a resource release request information receiving module, configured to receive resource release request information reported by the UE for specific service data.

Alternatively, the resource release request information receiving module is configured to receive the resource release request information reported by the UE for specific service data in the following manner:

receiving resource release request information reported by the UE for specific service data when a resource release condition is satisfied.

Alternatively, the resource release condition includes one or more of the following conditions: a distance between vehicles is greater than a fourth threshold, a moving speed is smaller than a fifth threshold, an acceleration is smaller than a sixth threshold, and a vehicle leaves a hotspot region, herein the fourth threshold, the fifth threshold and the sixth threshold are transmitted via broadcast signaling and/or RRC dedicated signaling, or preconfigured by a protocol.

Alternatively, the method further includes:

a shortest time threshold transmitting module, configured to transmit a shortest time threshold for state transition to the UE, the shortest time threshold being used to indicate, to the UE, a shortest time interval between activation of a resource for transmitting specific service data and release of the resource for transmitting specific service data.

Alternatively, the method further includes:

a state information receiving module, configured to receive state information reported by the UE.

Alternatively, the state information receiving module is configured to receive the state information reported by the UE in the following manner:

receiving state information reported by the UE via RRC dedicated signaling or a physical uplink control channel, herein the state information reported by the UE includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

Alternatively, the method further includes:

a period configuration information transmitting module, configured to indicate a period where the UE reports the state information.

Alternatively, the method further includes:

a state change threshold transmitting module, configured to indicate that the UE reports the state information when a state change of the UE exceeds the state change threshold.

The disclosure also provides a resource allocation method. The method includes the steps as follows.

Resource allocation information which is transmitted by a base station or a Road Side Unit (RSU) and used for transmitting specific service data is received.

The specific service data is transmitted according to the resource allocation information.

Herein, the resource allocation information for a specific service includes at least one of the following:

SPS resource information, preconfigured resource information and transmission resource pool information.

Alternatively, the SPS resource information includes one or more of the following:

service type indication information, resource pool priority indication information, and timer expiry threshold.

Alternatively, the preconfigured resource information includes one or more of the following:

resource period, resource subframe offset, resource frequency domain indicator, resource frequency domain configuration index, resource time domain indicator, resource time domain configuration index, transmitting power configuration information, resource pool priority indication information, preconfigured resource identification information, and timer expiry threshold.

Alternatively, the transmission resource pool information includes one or more of the following:

service type indication information, resource pool priority indication information, and timer expiry threshold.

Alternatively, the method further includes the step as follows.

Resource request information for specific service data is reported.

Alternatively, the step that resource request information for specific service data is reported includes:

when a resource activation condition is satisfied, resource request information for specific service data is reported.

Alternatively, the method further includes the step as follows.

Resource release request information for specific service data is reported.

Alternatively, the step that resource release request information for specific service data is reported includes:

when a resource release condition is satisfied, resource release request information for specific service data is reported.

Alternatively, the method further includes the step as follows.

State information is reported, herein the state information includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

Alternatively, the operation that state information is reported includes:

the state information is reported periodically, or, when a state change of the UE exceeds a state change threshold, the state information is reported.

Alternatively, the step that specific service data is transmitted according to the transmission resource pool information includes:

a timer is started, and when resource allocation is still not acquired after the timer expires, a resource is selected from a transmitting resource pool to transmit specific service data.

Alternatively, the step that specific service data is transmitted according to the transmission resource pool information includes:

when a UE is in an RRC idle state, a resource is selected from a resource pool having the highest resource pool priority to transmit specific service data; or, a resource is selected from a resource pool of which the service type is an emergency type to transmit specific service data; or, a resource most recent in a time domain is selected from all resource pools to transmit specific service data.

The embodiment of the disclosure also provides a resource allocation device. The device includes:

a resource allocation information receiving module, configured to receive resource allocation information which is transmitted by a base station or an RSU and used for transmitting specific service data; and a specific service data transmitting module, configured to transmit the specific service data according to the resource allocation information.

Herein, the resource allocation information for a specific service includes at least one of the following:

SPS resource information, preconfigured resource information and transmission resource pool information.

Alternatively, the SPS resource information includes one or more of the following: service type indication information, resource pool priority indication information, and timer expiry threshold.

Alternatively, the preconfigured resource information includes one or more of the following: resource period, resource subframe offset, resource frequency domain indicator, resource frequency domain configuration index, resource time domain indicator, resource time domain configuration index, transmitting power configuration information, resource pool priority indication information, preconfigured resource identification information, and timer expiry threshold.

Alternatively, the transmission resource pool information includes one or more of the following: service type indication information, resource pool priority indication information, and timer expiry threshold.

Alternatively, the device further includes:

a resource activation module, configured to report resource request information for specific service data; and a resource release module, configured to report resource release request information for specific service data.

Alternatively, the resource activation module is configured to report the resource request information for specific service data when a resource activation condition is satisfied; and the resource release module is configured to report the resource release request information for specific service data when a resource release condition is satisfied.

Alternatively, the device further includes:

a state information reporting module, configured to report state information, herein the state information includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

Alternatively, the state information reporting module is configured to report the state information periodically, or, report, when a state change of the UE exceeds a state change threshold, the state information.

Alternatively, the resource allocation information receiving module is configured to receive one or more pieces of transmission resource pool information transmitted by the base station or the RSU; and the specific service data transmitting module is configured to start a timer, and select, when resource allocation is still not acquired after the timer expires, a resource from a transmitting resource pool to transmit specific service data.

Alternatively, the specific service data transmitting module is configured to: select, when a UE is in an RRC idle state, a resource from a resource pool having the highest resource pool priority to transmit specific service data; or, select a resource from a resource pool of which the service type is an emergency type to transmit specific service data; or, select a resource most recent in a time domain from all resource pools to transmit specific service data.

The embodiment of the disclosure also provides a computer storage medium. A computer-executable instruction is stored in the computer storage medium. The computer-executable instruction is used to execute the above-mentioned method.

The embodiments of the disclosure have the beneficial effects as follows.

By means of the embodiments of the disclosure, a UE can rapidly obtain a radio resource to transmit specific service data. Compared with the related art, the technical solution greatly reduces communication delays.

After the drawings and the detailed descriptions are read and understood, other aspects may be understood.

DETAILED DESCRIPTION

Figure 1:
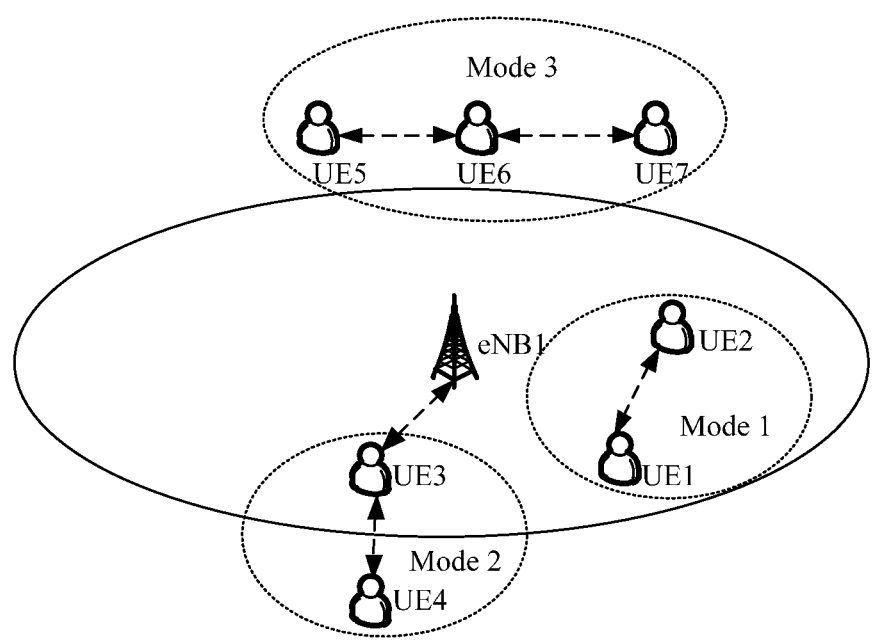
FIG. 1 is a discovery/communication diagram of a D2D system.

The embodiments of the disclosure will be illustrated below with reference to the drawings in detail. It is important to note that the embodiments of the disclosure and the characteristics in the embodiments can be randomly combined under the condition of no conflicts.

In the embodiments of the disclosure, resource allocation information for transmitting specific service data is transmitted to a UE, so that the UE can rapidly use an allocated resource to transmit the specific service data, thereby ensuring the timeliness of a specific service communication.

In the embodiments of the disclosure, a base station or an RSU transmits resource allocation information for transmitting specific service data to a UE, such that the UE transmits the specific service data according to the resource allocation information.

Herein, the resource allocation information includes at least one of the following:

SPS resource information, preconfigured resource information and transmission resource pool information.

After obtaining the allocated resource, the UE can use the resource to transmit data. The base station or the RSU allocates the resource to the UE by transmitting resource allocation information to the UE. In the present embodiment, the base station or the RSU transmits resource allocation information for transmitting specific service data to the UE, so the UE can use the allocated resource for transmitting specific service data to transmit the specific service data.

A specific service refers to an emergency service, a safety information service, a high-reliability service, and other services with low delay requirements.

The UE includes multiple UEs such as a mobile phone, a vehicle and a machine.

The specific service data may include one or more of the following data packets:

a data packet with a delay requirement lower than a given threshold;

a data packet with a GBR type;

a data packet with a GBR type and with a delay requirement lower than a given threshold;

a data packet with an emergency service type;

a Vehicle to Everything (V2X) data packet;

a V2X data packet with a delay requirement lower than a given threshold;

a data packet with an indicated service type; or a data packet with an indicated V2X service type.

The resource allocation information may be transmitted via a broadcast message or RRC dedicated signaling.

Alternatively, when the resource type of the specific service data packet is an indicated service type, specific service type indication information is transmitted to the UE: and when the resource type of the specific service data packet is an indicated V2X service type, specific V2X service type indication information is transmitted to the UE, herein the specific service type indication information and the specific V2X service type indication information are used to indicate a service type of the data packet.

Herein, the SPS resource information and the preconfigured resource information may be information of a resource pool or information of a specified resource.

The resource pool refers to: a set of multiple resources. When the SPS resource information and the preconfigured resource information are the information of the resource pool, the UE may select some or all resources from the resource pool to transmit specific service data. When the SPS resource information and the preconfigured resource information are the information of the specified resource, the UE may use the specified resource to transmit specific service data. In the related resource allocation technology, a dynamic scheduling technology is commonly adopted. That is, when the UE needs to transmit data, a resource allocation scheduling request is transmitted to the base station, and the base station allocates a dynamic scheduling resource to the UE according to the scheduling request. The dynamic scheduling resource is characterized in that this resource is only effective at an indicated subframe and is effective only once. In addition, an SPS resource (also referred to as semi-static schedule resource) mode is also defined in the related art. Different from dynamic scheduling, after the base station allocates an SPS resource to the UE, the UE may use the resource to transmit a data packet periodically. The SPS configuration information usually includes: resource period, resource subframe offset, resource frequency domain indicator, resource frequency domain configuration index, resource time domain indicator, resource time domain configuration index, transmitting power configuration information, and SPS identification information.

According to one embodiment of the disclosure, the related SPS mode is improved, and the SPS configuration information may further include one or more of the following: service type indication information, resource pool priority indication information, and timer expiry threshold.

Herein, the service type indication information is used to indicate that the service type is a common service or a specific service.

The specific service type includes a V2X service type. Alternatively, the V2X service type includes Vehicle-to-Vehicle Communications (V2V), Vehicle-to-Infrastructure Communications (V2I) and Vehicle-to-Pedestrian Communications (V2P).

The UE may determine whether the SPS resource can be used to transmit specific service data according to the indication of the service type. So, when needing to transmit a specific service, the UE may use an SPS resource of which the service type is configured as the specific service to transmit the specific service.

The resource pool priority indication information is used to indicate the priority of a resource, and a high-priority resource is used to transmit specific service data. When needing to transmit a specific service, the UE may use an SPS resource of which the resource pool priority is configured as high priority to transmit the specific service.

The timer expiry threshold is used to indicate expiry time for allocating an SPS resource. When the UE needs to transmit specific service data, a timer can be started, a resource is applied preferentially in a dynamic scheduling mode, but dynamically scheduled resource allocation is still not acquired when the timer exceeds the threshold, and the UE may use the SPS resource to transmit specific service data.

In the embodiments of the disclosure, the method further includes: a resource is allocated to the UE in a preconfigured resource mode, that is, before the UE has data to be transmitted, the base station allocates a resource to the UE in advance, herein the preconfigured resource information may include one or more of the following: resource period, resource subframe offset, resource frequency domain indicator, resource frequency domain configuration index, resource time domain indicator, resource time domain configuration index, transmitting power configuration information, resource pool priority indication information, preconfigured resource identification information, and timer expiry threshold. By means of the above information, a frequency resource block, a time subframe, the size of transmitting power and an identifier of this resource pool are indicated.

In the related art, the base station will transmit transmission resource pool information to the UE, herein the transmission resource pool information usually includes: resource period, resource subframe offset, resource frequency domain indicator, resource frequency domain configuration index, resource time domain indicator, resource time domain configuration index, and transmitting power configuration information.

In the embodiments of the disclosure, the transmission resource pool information may further include one or more of the following: service type indication information, resource pool priority indication information, and timer expiry threshold, herein the service type indication information is used to indicate that the service type is a common service or a specific service. The UE may determine whether the transmitting resource pool can be used to transmit specific service data according to the indication of the service type.

The resource pool priority indication information is used to indicate the priority of a resource, and a high-priority resource is used to transmit specific service data. By means of distinguishing in priority, a low-priority service can be prevented from preempting a resource of a high-priority service.

The timer expiry threshold is used to indicate expiry time. When the UE needs to transmit specific service data, a timer can be started, dynamically scheduled resource allocation is still not acquired when the timer exceeds the threshold, and the UE may select a resource from the transmitting resource pool to transmit specific service data.

Alternatively, the base station or RSU receives resource request information, reported by the UE, of specific service data, and resource release request information, reported by the UE, of specific service data.

In one embodiment, when a resource activation condition is satisfied, the UE reports resource request information of specific service data so as to activate a resource for transmitting specific service data; and when a resource release condition is satisfied, the UE reports resource release request information of specific service data so as to release the resource for transmitting specific service data.

Herein, the resource request information may be: an SPS resource activation request and a preconfigured resource activation request. The resource release request information may be: an SPS resource release request and a preconfigured resource release request.

Herein, the resource activation condition includes one or more of the following conditions: a distance between vehicles is smaller than a first threshold, a moving speed is greater than a second threshold, an acceleration is greater than a third threshold, a vehicle is to be steered to another lane and to go around a corner, or the vehicle enters a hotspot region, herein the first threshold, the second threshold and the third threshold are transmitted via broadcast signaling and/or RRC dedicated signaling, or preconfigured by a protocol.

The resource release condition includes one or more of the following conditions: a distance between vehicles is greater than a fourth threshold, a moving speed is smaller than a fifth threshold, an acceleration is smaller than a sixth threshold, and a vehicle leaves a hotspot region, herein the fourth threshold, the fifth threshold and the sixth threshold are transmitted via broadcast signaling and/or RRC dedicated signaling, or preconfigured by a protocol.

In order to prevent the UE from frequently activating and releasing the resource, the base station or RSU may transmit a shortest time threshold for state transition to the UE, the shortest time threshold being used to indicate, to the UE, a shortest time interval between activation of a resource for transmitting specific service data and release of the resource for transmitting specific service data.

Alternatively, the base station or RSU receives state information reported by the UE, and may determine, according to the received state information, whether to activate/release the resource for transmitting specific service data.

The state information reported by the UE may be received via RRC dedicated signaling or a physical uplink control channel. The state information reported by the UE includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

Herein, the geographical location information contains information of a current geographical location of the UE, and may be in a form of geographical location coordinates and the like.

The speed indication information contains information of a current speed of the UE.

The acceleration indication information contains information of a current acceleration of the UE.

The relative speed indication information contains information of a current speed of the UE relative to a certain specified reference.

The relative distance indication information contains information of a current distance of the UE relative to a certain specified reference.

The speed level information contains level information of the current speed of the UE.

The acceleration level information contains level information of the current acceleration of the UE.

The relative speed level information contains level information of the current speed of the UE relative to a certain specified reference.

The relative distance level information contains level information of the current distance of the UE relative to a certain specified reference.

In order to prevent the UE from frequently reporting the state information, period configuration information may be transmitted, the period configuration information being used to indicate a period where the UE reports the state information; and/or a state change threshold is transmitted, the state change threshold being used to indicate that the UE reports the state information when a state change of the UE exceeds the state change threshold.

The embodiment of the disclosure also provides a computer storage medium. A computer-executable instruction is stored in the computer storage medium. The computer-executable instruction is used to execute the above-mentioned method.

Figure 2:
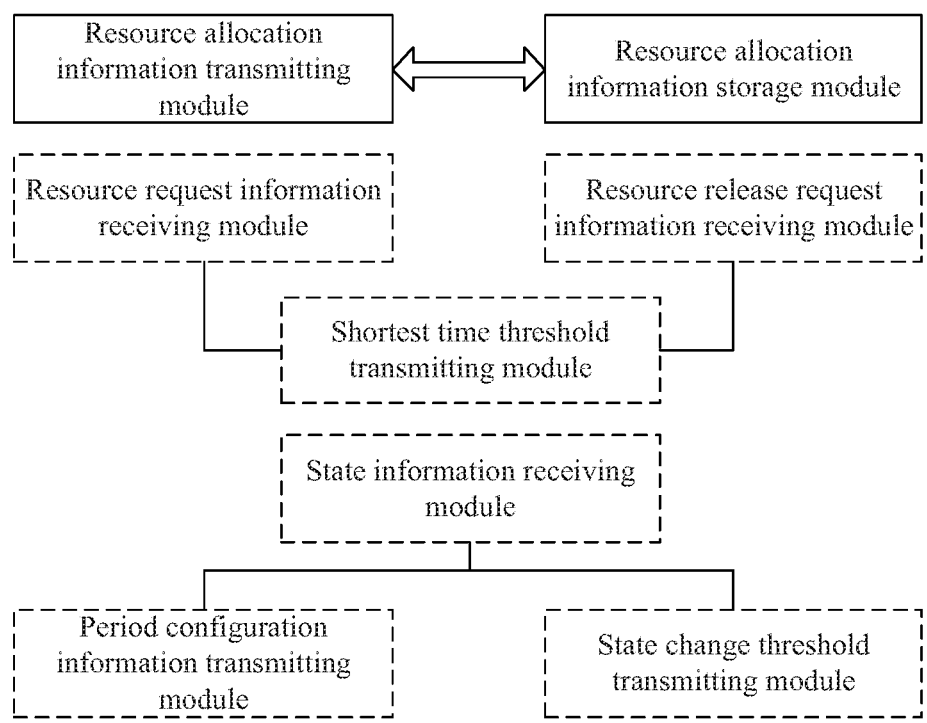
FIG. 2 is a modular diagram of a resource allocation device applied to a base station or an RSU according to an embodiment of the disclosure.

Correspondingly, a resource allocation device in the embodiment of the disclosure is applied to a base station or an RSU. As shown in FIG. 2, the device includes:

a resource allocation information transmitting module, configured to transmit resource allocation information for transmitting specific service data to a UE, and a resource allocation information storage module, configured to store the resource allocation information, herein the resource allocation information includes at least one of the following:

SPS resource information, preconfigured resource information and transmission resource pool information.

Alternatively, the resource allocation information transmitting module is configured to transmit the resource allocation information via a broadcast message or RRC dedicated signaling.

The device may further include the following modules:

a resource request information receiving module, configured to receive resource request information reported by the UE for specific service data, herein alternatively, the resource request information receiving module is configured to receive resource request information reported by the UE for specific service data when a resource activation condition is satisfied;

a resource release request information receiving module, configured to receive resource release request information reported by the UE for specific service data, herein alternatively, the resource release request information receiving module is configured to receive resource release request information reported by the UE for specific service data when a resource release condition is satisfied;

a shortest time threshold transmitting module, configured to transmit a shortest time threshold for state transition to the UE, the shortest time threshold being used to indicate, to the UE, a shortest time interval between activation of a resource for transmitting specific service data and release of the resource for transmitting specific service data; and a state information receiving module, configured to receive state information reported by the UE.

Alternatively, the state information receiving module is configured to receive the state information reported by the UE via RRC dedicated signaling or a physical uplink control channel.

A period configuration information transmitting module is configured to indicate a period where the UE reports the state information.

A state change threshold transmitting module is configured to indicate that the UE reports the state information when a state change of the UE exceeds the state change threshold.

A resource allocation method in the embodiment of the disclosure is applied to a UE and includes the steps as follows.

Resource allocation information which is transmitted by a base station or an RSU and used for transmitting specific service data is received.

The specific service data is transmitted according to the resource allocation information.

Herein, the resource allocation information for a specific service includes at least one of the following:

SPS resource information, preconfigured resource information and transmission resource pool information.

In one embodiment, the method further includes the step as follows. Resource request information for specific service data is reported.

Alternatively, the step that resource request information for specific service data is reported includes:

when a resource activation condition is satisfied, resource request information for specific service data is reported.

In one embodiment, the method further includes the step as follows. Resource release request information for specific service data is reported.

Alternatively, the step that resource release request information for specific service data is reported includes:

when a resource release condition is satisfied, resource release request information for specific service data is reported.

In one embodiment, the method further includes the step as follows. State information is reported, herein the state information includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

Alternatively, the state information is reported periodically, or, when a state change of the UE exceeds a state change threshold, the state information is reported.

Alternatively, the step that specific service data is transmitted according to the transmission resource pool information includes:

a timer is started, and when resource allocation is still not acquired after the timer expires, a resource is selected from a transmitting resource pool to transmit specific service data.

Alternatively, the step that specific service data is transmitted according to the transmission resource pool information includes:

when a UE is in an RRC idle state, a resource is selected from a resource pool having the highest resource pool priority to transmit specific service data; or, a resource is selected from a resource pool of which the service type is an emergency type to transmit specific service data; or, a resource most recent in a time domain is selected from all resource pools to transmit specific service data.

Figure 3:
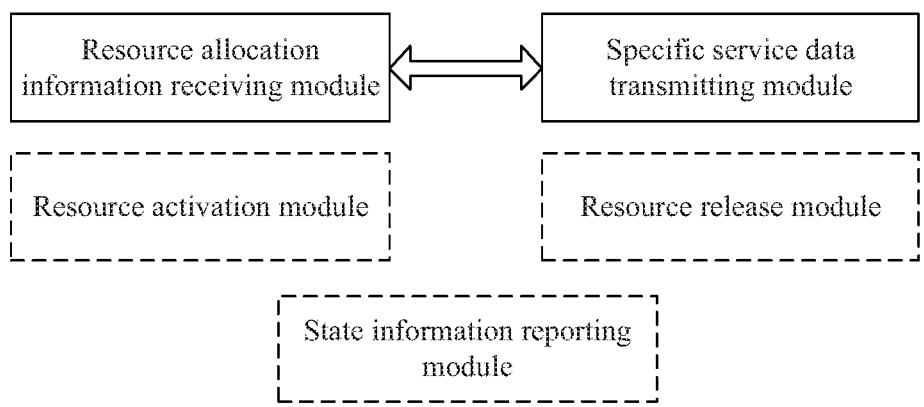
FIG. 3 is a modular diagram of a resource allocation device applied to a UE according to an embodiment of the disclosure.

A resource allocation device in the embodiment of the disclosure is applied to a UE. As shown in FIG. 3, the device may include:

a resource allocation information receiving module, configured to receive resource allocation information which is transmitted by a base station or an RSU and used for transmitting specific service data; and a specific service data transmitting module, configured to transmit the specific service data according to the resource allocation information.

Herein, the resource allocation information for a specific service includes at least one of the following:

SPS resource information, preconfigured resource information and transmission resource pool information.

The device may further include the following modules:

a resource activation module, configured to report resource request information for specific service data, herein alternatively, the resource activation module is configured to report the resource request information for specific service data when a resource activation condition is satisfied, a resource release module, configured to report resource release request information for specific service data, herein alternatively, the resource release module is configured to report the resource release request information for specific service data when a resource release condition is satisfied; and a state information reporting module, configured to report state information, herein the state information includes at least one of the following:

geographical location information, speed indication information, acceleration indication information, relative speed indication information, relative distance indication information, speed level information, acceleration level information, relative speed level information, relative distance level information, and variation indication information of one or more of the above parameters.

The state information reporting module may report the state information periodically, or, report, when a state change of the UE exceeds a state change threshold, the state information.

Alternatively, the resource allocation information receiving module is configured to receive one or more pieces of transmission resource pool information transmitted by the base station or the RSU; and the specific service data transmitting module is configured to start a timer, and select, when resource allocation is still not acquired after the timer expires, a resource from a transmitting resource pool to transmit specific service data.

Alternatively, the specific service data transmitting module is configured to: select, when a UE is in an RRC idle state, a resource from a resource pool having the highest resource pool priority to transmit specific service data; or, select a resource from a resource pool of which the service type is an emergency type to transmit specific service data; or, select a resource most recent in a time domain from all resource pools to transmit specific service data.

A specific possible low-delay communication implementation method and a related signaling flow are given hereinbelow through embodiments.

Embodiment 1

A base station transmits SPS resource information via a broadcast message or RRC dedicated signaling, the SPS resource information including one or more of the following: service type indication information, resource period, resource subframe offset, resource frequency domain indicator, resource frequency domain configuration index, resource time domain indicator, resource time domain configuration index, transmitting power configuration information, resource pool priority indication information, SPS identification information (C-RNTI), and timer expiry threshold.

The base station transmits an entry threshold and an exit threshold of a moving speed, and an entry threshold and an exit threshold of a vehicle distance, via the broadcast message or the RRC dedicated signaling. In addition, in order to prevent from frequently activating and releasing an SPS resource, alternatively, the base station will also transmit a shortest time threshold for activation/release state transition, that is, after initiating an activation/release resource pool request, the UE will no longer initiate the activation/release resource pool request within the time threshold.

Figure 4:
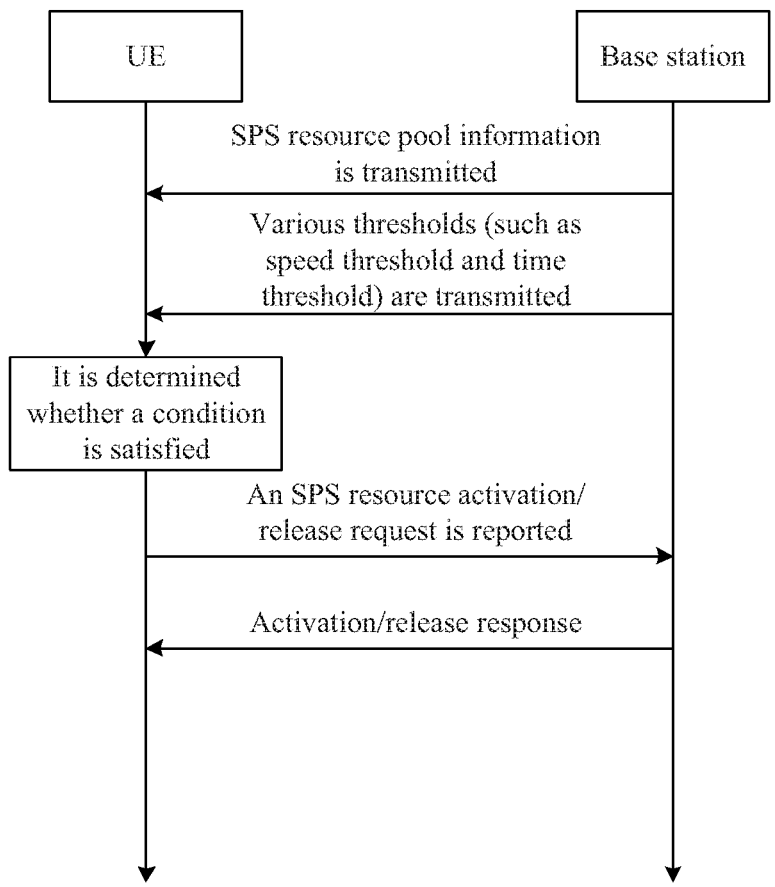
FIG. 4 is a diagram of Embodiment 1 in the disclosure.

Alternatively, with reference to FIG. 4, an activation flow is as follows.

when the UE satisfies a condition, an SPS activation request is reported, herein the condition includes:

a distance between vehicles is smaller than the entry threshold, a moving speed is greater than the entry threshold, a vehicle is to be steered to another lane and to go around a corner, or the vehicle enters a hotspot region. The threshold of the moving speed and the threshold of the vehicle distance may be issued by the base station or preconfigured by a protocol.

After receiving the SPS resource activation request reported by the UE, the base station transmits activation response information.

After receiving the activation information, the UE activates an SPS resource, and when the UE has specific service data to be transmitted, the SPS resource can be used to transmit specific service data to other UEs.

Alternatively, before initiating the activation request, the UE needs to determine whether a timer expires, and when a time interval from the previous initiation of a resource release request initiated by the UE is greater than the shortest time threshold for activation/release state transition, the activation request may be initiated.

A release flow is as follows.

If the UE has activated the SPS, when satisfying a condition, the UE reports an SPS resource release request, herein the condition includes, but not limited to, a distance between vehicles is greater than the entry threshold, a moving speed is smaller than the entry threshold, and a vehicle exits from a hotspot region. The threshold of the moving speed and the threshold of the vehicle distance may be issued by the base station or preconfigured by a protocol.

After receiving the SPS resource release request reported by the UE, the base station transmits SPS resource release response information.

After receiving the release information, the UE releases an SPS resource.

Alternatively, before initiating the release request, the UE needs to determine whether a timer expires, and when a time interval from the previous initiation of a resource activation request initiated by the UE is greater than the shortest time threshold for activation/release state transition, the release request may be initiated.

In the present embodiment, when the UE satisfies the condition, resource allocation may be applied in advance, so when specific service data needing to be transmitted, it is unnecessary to perform a resource request flow again, the specific service data is transmitted to other UEs by using a pre-allocated resource, and delays are effectively reduced.

Embodiment 2

A base station transmits SPS resource information via a broadcast message or RRC dedicated signaling, the SPS resource information including one or more of the following: service type indication information, resource period, resource subframe offset, resource frequency domain indicator, resource frequency domain configuration index, resource time domain indicator, resource time domain configuration index, transmitting power configuration information, resource pool priority indication information, SPS identification information (C-RNTI), and timer expiry threshold.

If the base station activates an SPS resource pool of a UE to transmit cellular data or D2D data, when the UE has specific service data to be transmitted, the UE directly uses an SPS resource to transmit specific service data to other UEs.

If cellular data needs to be transmitted at this resource position at the same time, the cellular data is abandoned due to low priority, and retransmission is performed subsequently.

In the present embodiment, the base station allocates a resource to the UE in an SPS resource mode, so when the UE has specific service data to be transmitted, it is unnecessary to perform a resource request flow, the specific service data is transmitted to other UEs by using an SPS allocated resource, and delays are effectively reduced.

Embodiment 3

Figure 5:
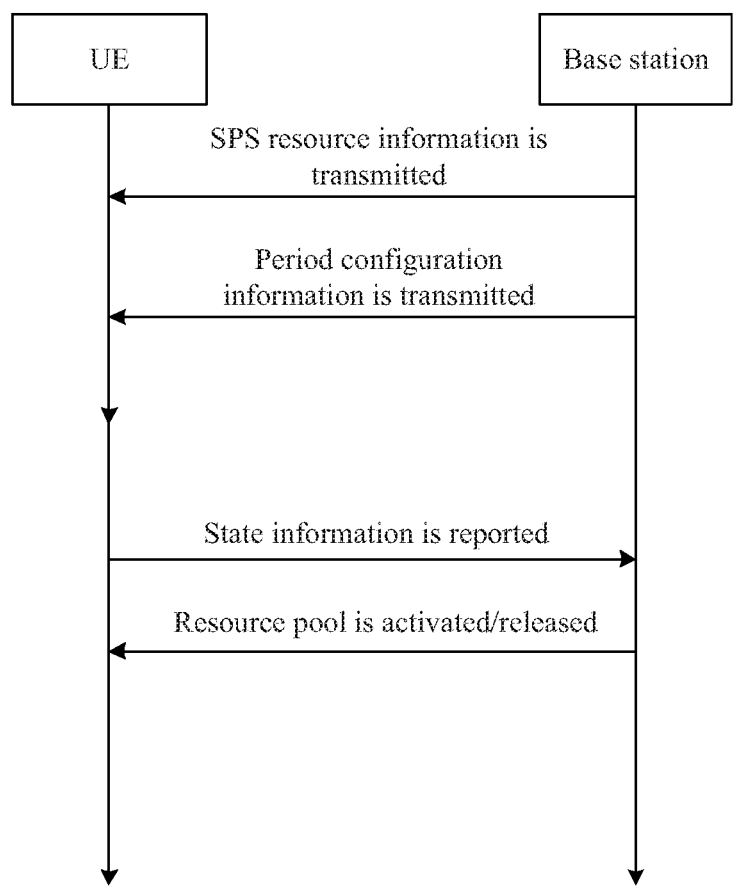
FIG. 5 is a diagram of Embodiment 3 in the disclosure.

With reference to FIG. 5, a base station transmits SPS resource information via a broadcast message or RRC dedicated signaling, the SPS resource information including at least one of the following: resource period, resource subframe offset, resource frequency domain indicator, resource frequency domain configuration index, resource time domain indicator, resource time domain configuration index, transmitting power configuration information, resource pool priority indication information, SPS identification information (C-RNTI), and timer expiry threshold. The SPS resource is a set including multiple resources, and is equivalent to a resource pool.

The base station transmits period configuration information, the period being used to indicate a period where a UE reports state information.

The UE reports the state information periodically.

Alternatively, the UE reports the state information via RRC dedicated signaling or a physical uplink control channel.

Herein, the state information includes at least one of the following: geographical location information, speed indication information, acceleration indication information, relative speed indication information, relative distance indication information, speed level information, acceleration level information, relative speed level information, relative distance level information, and variation indication information of one or more of the above parameters.

The base station determines and transmits indicating signaling for activating an SPS resource pool according to the state information reported by the UE.

After receiving activation signaling, the UE activates an SPS resource, and when the UE has specific service data to be transmitted, the specific service data can be transmitted to other UEs by using the SPS resource.

A release flow is as follows.

If the UE has activated the SPS, the base station determines and transmits indicating signaling for releasing the SPS resource pool according to the state information reported by the UE.

After receiving release information, the UE releases the SPS.

In the present embodiment, the base station allocates a resource to the UE in advance according to the state situation reported by the UE and activates the resource, when the UE has specific service data to be transmitted, the specific service data can be transmitted to other UEs by using the SPS resource allocated by the base station preferentially, and delays are effectively reduced.

Embodiment 4

Figure 6:
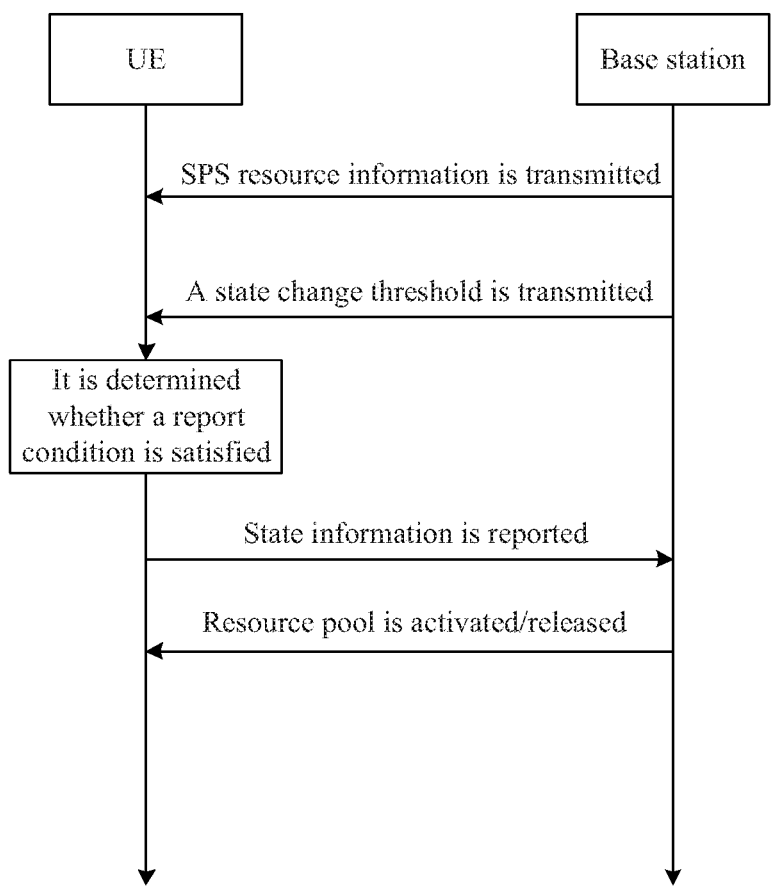
FIG. 6 is a diagram of Embodiment 4 in the disclosure.

With reference to FIG. 6, the distance between the present embodiment and Embodiment 3 lies in:

a base station transmits a state change threshold, for indicating that a UE reports state information when a state change of the UE exceeds a threshold.

Herein, the state information includes at least one of the following: geographical location information, speed indication information, acceleration indication information, relative speed indication information, relative distance indication information, speed level information, acceleration level information, relative speed level information, relative distance level information, and variation indication information of one or more of the above parameters.

When the state information change of the UE exceeds the threshold, the UE reports the state information.

Alternatively, the UE reports the state information via RRC dedicated signaling or a physical uplink control channel.

Alternatively, before the UE reports the state information, the base station transmits a time threshold.

After the UE transmits the state information, a timer is started, a time interval between reporting by the UE of the state information for two successive times being greater than the time threshold.

In the present embodiment, when the state information change of the UE exceeds the threshold, the UE reports the state information, and the state information is prevented from being frequently reported when the state of the UE fluctuates drastically, so as to save unnecessary air interface overheads.

Embodiment 5

Figure 7:
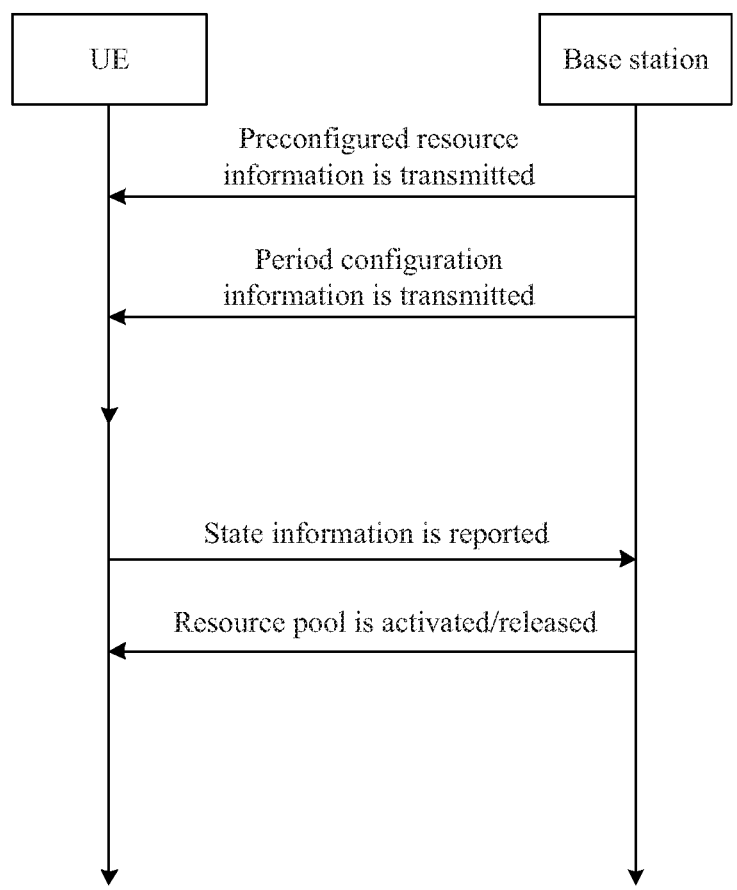
FIG. 7 is a diagram of Embodiment 5 in the disclosure.

With reference to FIG. 7, a base station transmits preconfigured resource information via a broadcast message or RRC dedicated signaling, the preconfigured resource information including at least one of the following: resource period, resource subframe offset, resource frequency domain indicator, resource frequency domain configuration index, resource time domain indicator, resource time domain configuration index, transmitting power configuration information, resource pool priority indication information, preconfigured resource identification information (C-RNTI), and timer expiry threshold. The preconfigured resource is a set including multiple resources, and is equivalent to a resource pool.

The base station transmits period configuration information, the period being used to indicate a period where a UE reports state information.

The UE reports the state information periodically.

Alternatively, the UE reports the state information via RRC dedicated signaling or a physical uplink control channel.

Herein, the state information includes one or more of the following: geographical location information, speed indication information, acceleration indication information, relative speed indication information, relative distance indication information, speed level information, acceleration level information, relative speed level information, relative distance level information, and variation indication information of one or more of the above parameters.

The base station determines and transmits indicating signaling (i.e., preconfigured resource activation signaling) for activating a preconfigured scheduling resource pool according to the state information reported by the UE.

Alternatively, transmitting the preconfigured resource activation signaling includes: scrambling a physical downlink control channel via a preconfigured resource C-RNTI so as to indicate activation of a preconfigured resource; or scrambling a physical downlink control channel via an SPS resource C-RNTI to activate an SPS resource, and transmitting indication information, the indication information being used to indicate activation of a cellular SPS resource or a preconfigured resource.

If the transmitted indication information indicates activation of the preconfigured resource, after receiving activation signaling, the UE activates a preconfigured scheduling resource, and when the UE has specific service data to be transmitted, the specific service data can be transmitted to other UEs by using the preconfigured resource. When the UE does not have specific service data to be transmitted, data of other D2D services can be transmitted.

A release flow is as follows.

If the UE has activated the preconfigured resource, the base station determines and transmits indicating signaling (i.e., preconfigured resource release signaling) for releasing the preconfigured resource pool according to the state information reported by the UE.

Alternatively, transmitting the preconfigured resource release signaling, including: scrambling a physical downlink control channel via a preconfigured resource C-RNTI so as to indicate release of a preconfigured resource; or scrambling a physical downlink control channel via an SPS resource C-RNTI to activate an SPS resource, and transmitting indication information, the indication information being used to indicate release of a cellular SPS resource or a preconfigured resource.

If the transmitted indication information indicates release of the preconfigured resource, after receiving the release signaling, the UE releases the preconfigured resource.

It is important to note that the preconfigured resource in the present embodiment is different from the SPS resource in Embodiment 1. The preconfigured resource is used to transmit D2D data, and the base station may transmit the SPS resource and the preconfigured resource via RRC dedicated signaling.

In the present embodiment, the base station allocates a resource to the UE in advance according to the state situation reported by the UE and activates the resource, when the UE has specific service data to be transmitted, the specific service data can be transmitted to other UEs by using the SPS resource allocated by the base station preferentially, and delays are effectively reduced.

Embodiment 6

Figure 8:
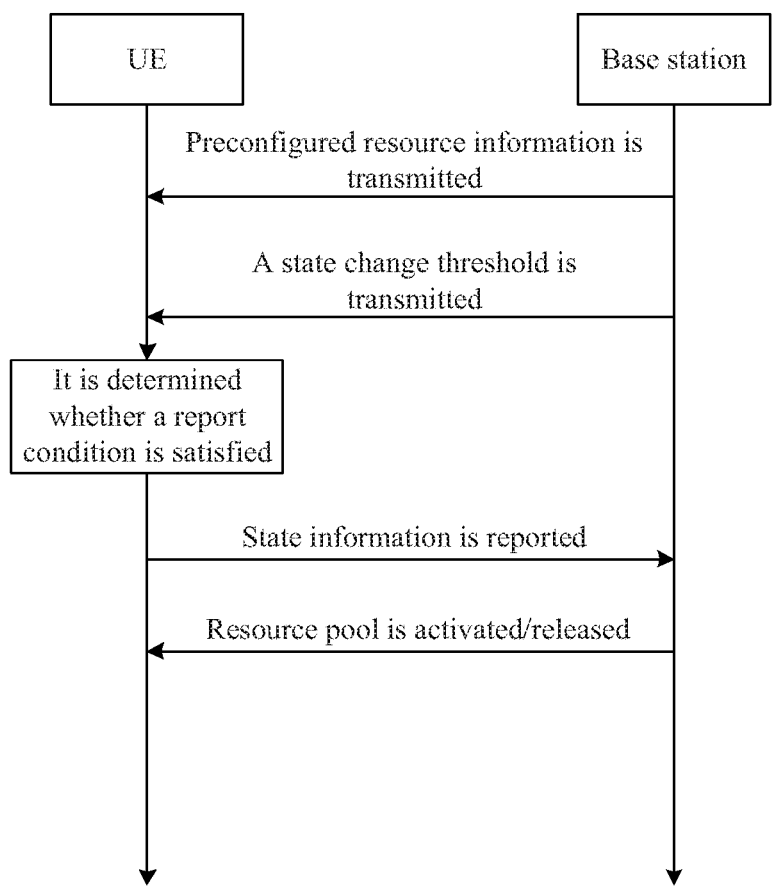
FIG. 8 is a diagram of Embodiment 6 in the disclosure.

With reference to FIG. 8, the difference between the present embodiment and Embodiment 5 lies in:

a base station transmits a state change threshold, the state change threshold being used to indicate that a UE reports state information when a state change of the UE exceeds a threshold.

Herein, the state information includes one or more of the following: geographical location information, speed indication information, acceleration indication information, relative speed indication information, relative distance indication information, speed level information, acceleration level information, relative speed level information, relative distance level information, and variation indication information of one or more of the above parameters.

When the state information change of the UE exceeds the threshold, the UE reports the state information.

Alternatively, before the UE reports the state information, the base station transmits a time threshold.

After the UE transmits the state information, a timer is started, a time interval between reporting by the UE of the state information for two successive times being greater than the time threshold.

Embodiment 7

Figure 9:
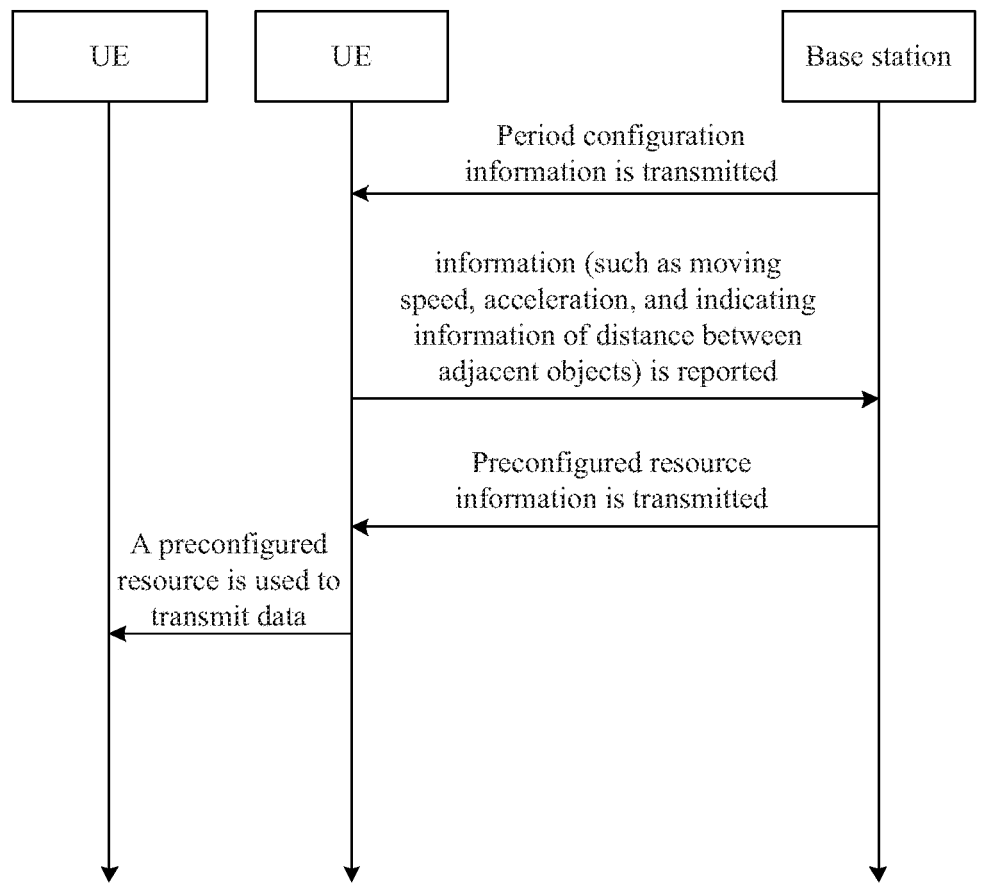
FIG. 9 is a diagram of Embodiment 7 in the disclosure.

With reference to FIG. 9, a base station transmits period configuration information, the period being used to indicate a period where a UE reports state information.

The UE reports the state information periodically.

Alternatively, the UE reports the state information via RRC dedicated signaling or a physical uplink control channel.

Herein, the state information includes one or more of the following: geographical location information, speed indication information, acceleration indication information, relative speed indication information, relative distance indication information, speed level information, acceleration level information, relative speed level information, relative distance level information, and variation indication information of one or more of the above parameters.

The base station determines and transmits preconfigured resource information according to the state information reported by the UE. Alternatively, the base station transmits the preconfigured resource information via a broadcast message or RRC dedicated signaling, the preconfigured resource information including at least one of the following: resource period, resource subframe offset, resource frequency domain indicator, resource frequency domain configuration index, resource time domain indicator, resource time domain configuration index, transmitting power configuration information, resource pool priority indication information, preconfigured resource identification information (C-RNTI), and timer expiry threshold.

After receiving the preconfigured resource information, the UE activates a preconfigured resource, and when the UE has specific service data to be transmitted, the specific service data can be transmitted to other UEs by using the preconfigured resource. When the UE does not have specific service data to be transmitted, data of other D2D services can be transmitted.

When the UE detects uplink out-of-synchronization or entry of an RRC idle state, resources of a preconfigured resource pool are released.

In the present embodiment, the base station allocates a resource to the UE in advance according to the state situation reported by the UE and activates the resource, when the UE has specific service data to be transmitted, the specific service data can be transmitted to other UEs by using an SPS resource allocated by the base station preferentially, and delays are effectively reduced.

Embodiment 8

A base station transmits one or more pieces of transmission resource pool information via a broadcast message or RRC dedicated signaling, the transmission resource pool information including at least one of the following: resource period, resource subframe offset, resource frequency domain indicator, resource frequency domain configuration index, resource time domain indicator, resource time domain configuration index, transmitting power configuration information, service type indication information, resource pool priority indication information, and timer expiry threshold.

When a UE having a D2D function is in an RRC connected state, the UE receives one or more pieces of transmission resource pool information transmitted by the base station, and determines a transmitting resource pool of specific service data. When a data packet with a specific service type reaches, a timer is started, a resource allocation request is initiated to the base station, and when data resource allocation is still not acquired after the timer expires, a resource is selected from the transmitting resource pool to transmit data to other UEs.

Herein, the operation that the UE selects a resource from the transmitting resource pool to transmit data includes: a resource is selected from a resource pool having the highest resource pool priority to transmit data; or, a resource is selected from a resource pool of which the service type is an emergency type to transmit data; or, a resource most recent in a time domain is selected from all resource pools to transmit data; or, a resource is selected from an abnormal resource pool to transmit data.

In the present embodiment, when the UE has specific service data to be transmitted, if resource allocation is still not obtained after the timer expires, a resource is selected from the transmitting resource pool to transmit specific service data to other UEs, thereby avoiding from waiting for resource allocation for a long time or performing a resource request flow again, and effectively reducing delays.

Embodiment 9

A base station transmits one or more pieces of transmission resource pool information via a broadcast message or RRC dedicated signaling, the transmission resource pool information including at least one of the following: resource period, resource subframe offset, resource frequency domain indicator, resource frequency domain configuration index, resource time domain indicator, resource time domain configuration index, transmitting power configuration information, resource pool priority indication information, and timer expiry threshold.

When a UE having a D2D function is in an RRC connected state, the UE receives one or more pieces of transmission resource pool information, selects a resource from a resource pool having the highest resource pool priority to transmit data, or, selects a resource from a resource pool of which the service type is an emergency type to transmit data, or, selects a resource most recent in a time domain from all resource pools to transmit data, or, selects a resource from an abnormal resource pool to transmit data.

In the present embodiment, when the UE has specific service data to be transmitted, a resource in the transmitting resource pool can be used preferentially to transmit specific service data to other UEs, thereby effectively reducing delays.

Embodiment 10

Figure 10:
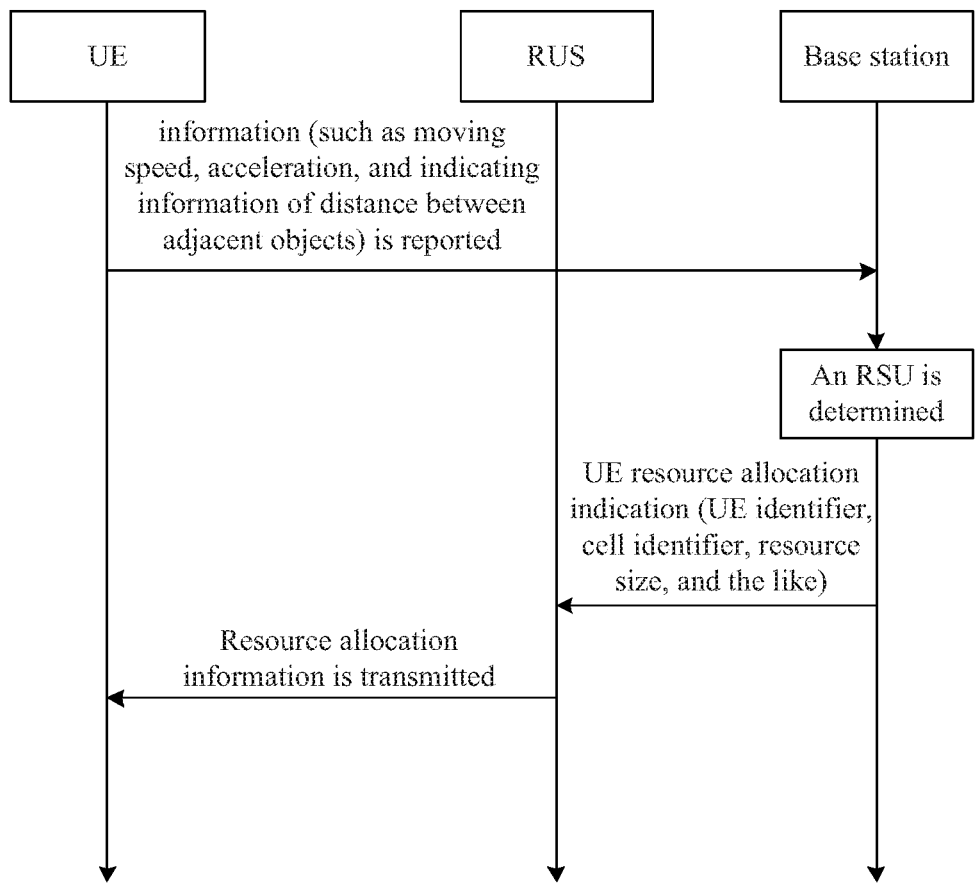
FIG. 10 is a diagram of Embodiment 10 in the disclosure.

With reference to FIG. 10, in the present embodiment, an RSU replaces a base station to achieve all or some resource allocation functions.

In each of the above-mentioned embodiments, operations executed by the base station may be implemented by using the RSU instead. Or, the base station and the RSU co-achieve resource allocation. For example, after the base station receives state information reported by a UE, the determined UE accesses the RSU, and then the RSU allocates a resource to the UE.

Alternatively, with reference to FIG. 10, the base station receives the state information reported by the UE, herein the state information includes one or more of the following: geographical location information, speed indication information, acceleration indication information, relative speed indication information, relative distance indication information, speed level information, acceleration level information, relative speed level information, relative distance level information, and variation indication information of one or more of the above parameters.

The base station determines the RSU serving it according to the state information reported by the UE, and transmits resource allocation indication information of the UE to the RSU, herein the resource allocation indication information of the UE includes one or more of the following: C-RNTI information of the UE, size indication information of resources needed by the UE, and a cell identifier.

The RSU allocates a resource to the UE according to the indication information, and resource allocation information is transmitted to the UE.

In the present embodiment, when the UE has specific service data to be transmitted, the resource allocated by the RSU can be used to transmit the specific service data to other UEs, thereby effectively reducing delays.

Embodiment 11

Figure 11:
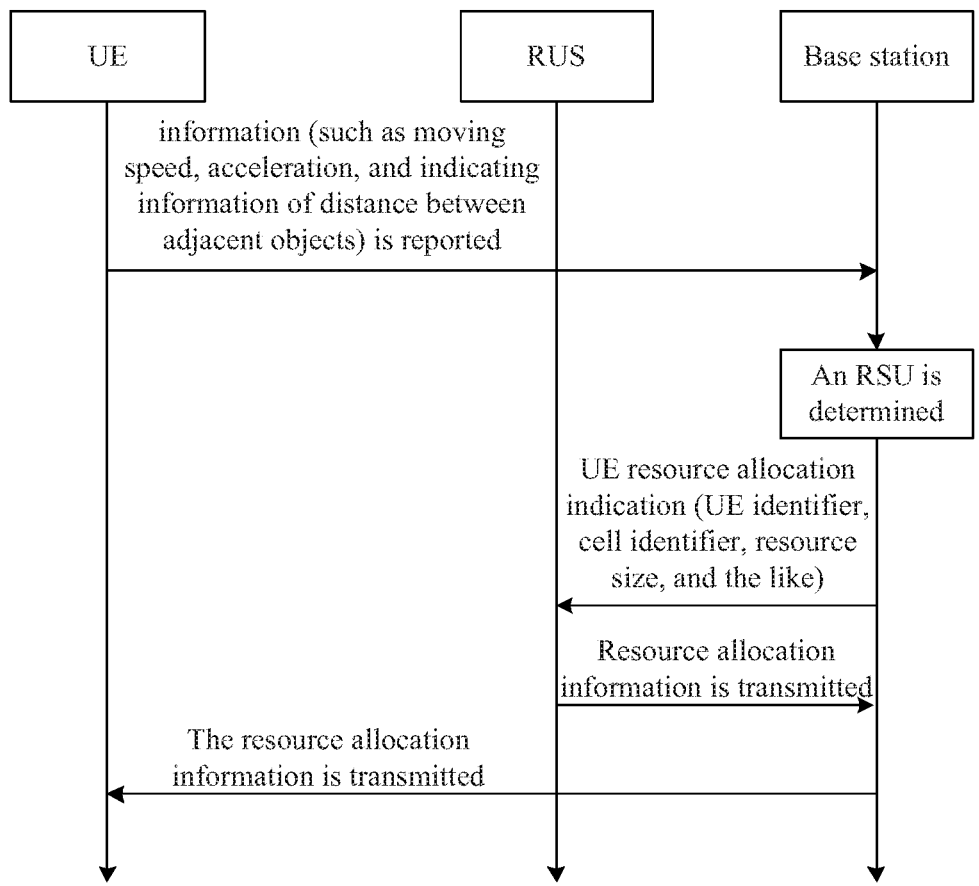
FIG. 11 is a diagram of Embodiment 11 in the disclosure.

With reference to FIG. 11, the difference from Embodiment 11 lies in that an RSU transmits resource allocation information to a base station, and the base station transmits the received resource allocation information to a UE.

In the present embodiment, when the UE has specific service data to be transmitted, a resource allocated by the RSU can be used to transmit the specific service data to other UEs, thereby effectively reducing delays.

It is important to note that although the embodiment of the disclosure provides an improvement solution for a D2D technology, the embodiment of the disclosure is similarly applied to the technical field of communications via other peer entities such as a Machine to Machine (M2M) system.

The above contents are further detailed illustrations for the disclosure with reference to the detailed description, and specific implementation of the disclosure cannot be regarded as limitations to these illustrations.

Those of ordinary skill in the art may understand that all or some of the steps of the above-mentioned embodiment may be implemented by using a computer program flow. The computer program may be stored in a computer-readable storage medium. The computer program is executed on a corresponding hardware platform (such as system, equipment, device and apparatus). During execution, the computer program includes one of the steps of the method embodiment or a combination thereof.

Alternatively, all or some of the steps of the above-mentioned embodiment may also be implemented by using an integrated circuit. These steps may be manufactured into integrated circuit modules respectively, or a plurality of modules or steps therein are manufactured into a single integrated circuit module. Thus, the disclosure is not limited to a combination of any specific hardware and software.

Each device/functional module/function unit in the above-mentioned embodiment may be implemented by using a general computation device. They may be centralized on a single computation device or may be distributed on a network composed of a plurality of computation devices.

When being implemented in a form of software function module and is sold or used as an independent product, each device/functional module/function unit in the above-mentioned embodiment may be stored in a computer-readable storage medium. The above-mentioned computer-readable storage medium may be a read-only memory, a magnetic disk or an optical disk.

INDUSTRIAL APPLICABILITY

In the above-mentioned technical solution, a UE can rapidly obtain a radio resource to transmit specific service data. Compared with the related art, the technical solution greatly reduces communication delays.

The invention claimed is:

1. A resource allocation method, comprising:
receiving resource allocation information which is transmitted by a base station or a RoadSide Unit (RSU) and used for transmitting specific service data; and
transmitting the specific service data according to the resource allocation information,
wherein the resource allocation information for a specific service comprises at least one of the following:
Semi-persistent Schedule (SPS) resource information, preconfigured resource information or transmission resource pool information,
wherein the SPS resource information comprises at least one of: service type indication information, resource pool priority indication information, or timer expiry threshold;
wherein the preconfigured resource information comprises at least one of:
resource period, resource subframe offset, resource frequency domain indicator, resource frequency domain configuration index, resource time domain indicator, resource time domain configuration index, transmitting power configuration information, resource pool priority indication information, preconfigured resource identification information, or timer expiry threshold;
wherein the transmission resource pool information comprises at least one of: service type indication information, resource pool priority indication information, or timer expiry threshold;
wherein the method further comprising:
reporting resource request information for specific service data;
wherein the reporting resource request information for specific service data comprises:
when a resource activation condition is satisfied, reporting resource request information for specific service data;
wherein the resource activation condition comprises one or more of the following conditions: a distance between vehicles is smaller than a first threshold, a moving speed is greater than a second threshold, an acceleration is greater than a third threshold, a vehicle is to be steered to another lane and to go around a corner, or the vehicle enters a hotspot region, and
wherein the first threshold, the second threshold and the third threshold are transmitted via at least one of broadcast signaling or Radio Resource Control (RRC) dedicated signaling, or preconfigured by a protocol.

2. The method according to claim 1, further comprising:
reporting resource release request information for specific service data.

3. The method according to claim 2, wherein reporting the resource release request information for specific service data comprises:
when a resource release condition is satisfied, reporting resource release request information for specific service data;
wherein the resource release condition comprises one or more of the following conditions:
a distance between vehicles is greater than a fourth threshold, a moving speed is smaller than a fifth threshold, an acceleration is smaller than a sixth threshold, or a vehicle leaves a hotspot region,
wherein the fourth threshold, the fifth threshold and the sixth threshold are transmitted via at least one of broadcast signaling or Radio Resource Control (RRC) dedicated signaling, or preconfigured by a protocol.

4. The method according to claim 1, further comprising:
reporting state information,
wherein the state information comprises at least one of the following:
geographical location information, speed indication information, acceleration indication information, relative speed indication information, relative distance indication information, speed level information, acceleration level information, relative speed level information, relative distance level information, or variation indication information of one or more of the above parameters.

5. The method according to claim 4, wherein reporting state information comprises:
reporting the state information periodically, or, when a state change of a User Equipment (UE) exceeds a state change threshold, reporting the state information.

6. The method according to claim 4, further comprising at least one of:
receiving, before reporting the state information, period configuration information, the period configuration information being used to indicate a period where the UE reports the state information; or
receiving a state change threshold, the state change threshold being used to indicate that the UE reports the state information when a state change of the UE exceeds the state change threshold.

7. The method according to claim 1, wherein transmitting the specific service data according to the transmission resource pool information comprises:
starting a timer, and when resource allocation is still not acquired after the timer expires, selecting a resource from a transmitting resource pool to transmit specific service data.

8. The method according to claim 1, wherein transmitting the specific service data according to the transmission resource pool information comprises:
when a User Equipment (UE) is in a Radio Resource Control (RRC) idle state, selecting a resource from a resource pool having the highest resource pool priority to transmit specific service data; or, selecting a resource from a resource pool of which the service type is an emergency type to transmit specific service data; or, selecting a resource most recent in a time domain from all resource pools to transmit specific service data.

9. The method according to claim 1, wherein the specific service data comprises one or more of the following data packets:

a data packet with a delay requirement lower than a given threshold;
a data packet with a Guaranteed Bit Rate (GBR) type;
a data packet with a GBR type and with a delay requirement lower than a given threshold;
a data packet with an emergency service type;
a Vehicle to Everything (V2X) data packet;
a V2X data packet with a delay requirement lower than a given threshold;
a data packet with an indicated service type; or
a data packet with an indicated V2X service type.

10. The method according to claim 9, further comprising:
when the specific service data comprises the data packet with the indicated service type, transmitting specific service type indication information to the UE; and
when the specific service data comprises the data packet with the indicated V2X service type, transmitting specific V2X service type indication information to the UE, the specific service type indication information and the specific V2X service type indication information being used to indicate a service type of the data packet.

11. The method according to claim 1, further comprising:
activating a resource for transmitting specific service data after receiving activation information; or
releasing a resource for transmitting specific service data after receiving release information.

12. The method according to claim 11, wherein activating the resource for transmitting specific service data comprises:
receiving resource activation signaling, which comprises:
scrambling a physical downlink control channel via a Radio Network Temporary Identifier (RNTI) so as to indicate activation of the resource; or
scrambling a physical downlink control channel via an SPS resource RNTI to activate an SPS resource, and receiving indication information for indicating activation of the SPS resource.

13. The method according to claim 11, wherein releasing the resource for transmitting specific service data comprises:
receiving resource release signaling, which comprises:
scrambling a physical downlink control channel via an RNTI so as to indicate release of the resource; or
scrambling a physical downlink control channel via an SPS resource Cell Radio Network Temporary Identifier (C-RNTI) to activate an SPS resource, and receiving indication information for indicating release of the SPS resource.

14. A resource allocation device, comprising:
a memory storing processor-executable instructions; and
a processor arranged to execute the stored processor-executable instructions to perform steps of the resource allocation method according to claim 1.

15. A resource allocation method, comprising:
receiving resource allocation information which is transmitted by a base station or a RoadSide Unit (RSU) and used for transmitting specific service data; and
transmitting the specific service data according to the resource allocation information,
wherein the resource allocation information for a specific service comprises at least one of the following:
Semi-persistent Schedule (SPS) resource information, preconfigured resource information or transmission resource pool information,
wherein the SPS resource information comprises at least one of: service type indication information, resource pool priority indication information, or timer expiry threshold;
wherein the preconfigured resource information comprises at least one of:
resource period, resource subframe offset, resource frequency domain indicator, resource frequency domain configuration index, resource time domain indicator, resource time domain configuration index, transmitting power configuration information, resource pool priority indication information, preconfigured resource identification information, or timer expiry threshold;
wherein the transmission resource pool information comprises at least one of: service type indication information, resource pool priority indication information, or timer expiry threshold;
wherein the method further comprises:
reporting resource release request information for specific service data;
wherein reporting the resource release request information for specific service data comprises:
when a resource release condition is satisfied, reporting resource release request information for specific service data;
wherein the resource release condition comprises one or more of the following conditions:
a distance between vehicles is greater than a fourth threshold, a moving speed is smaller than a fifth threshold, an acceleration is smaller than a sixth threshold, or a vehicle leaves a hotspot region,
wherein the fourth threshold, the fifth threshold and the sixth threshold are transmitted via at least one of broadcast signaling or Radio Resource Control (RRC) dedicated signaling, or preconfigured by a protocol.

16. The method according to claim 15, wherein the specific service data comprises one or more of the following data packets:
a data packet with a delay requirement lower than a given threshold;
a data packet with a Guaranteed Bit Rate (GBR) type;
a data packet with a GBR type and with a delay requirement lower than a given threshold;
a data packet with an emergency service type;
a Vehicle to Everything (V2X) data packet;
a V2X data packet with a delay requirement lower than a given threshold;
a data packet with an indicated service type; or
a data packet with an indicated V2X service type.

17. The method according to claim 16, further comprising:
when the specific service data comprises the data packet with the indicated service type, transmitting specific service type indication information to the UE; and
when the specific service data comprises the data packet with the indicated V2X service type, transmitting specific V2X service type indication information to the UE, the specific service type indication information and the specific V2X service type indication information being used to indicate a service type of the data packet.

18. The method according to claim 15, further comprising:
activating a resource for transmitting specific service data after receiving activation information; or
releasing a resource for transmitting specific service data after receiving release information.

19. The method according to claim 18, wherein activating the resource for transmitting specific service data comprises:
receiving resource activation signaling, which comprises:

scrambling a physical downlink control channel via a Radio Network Temporary Identifier (RNTI) so as to indicate activation of the resource; or scrambling a physical downlink control channel via an SPS resource RNTI to activate an SPS resource, and receiving indication information for indicating activation of the SPS resource.

20. The method according to claim 18, wherein releasing the resource for transmitting specific service data comprises:
receiving resource release signaling, which comprises:
scrambling a physical downlink control channel via an RNTI so as to indicate release of the resource; or
scrambling a physical downlink control channel via an SPS resource Cell Radio Network Temporary Identifier (C-RNTI) to activate an SPS resource, and receiving indication information for indicating release of the SPS resource.

21. A resource allocation method, comprising:
receiving resource allocation information which is transmitted by a base station or a RoadSide Unit (RSU) and used for transmitting specific service data; and
transmitting the specific service data according to the resource allocation information,
wherein the resource allocation information for a specific service comprises at least one of the following:
Semi-persistent Schedule (SPS) resource information, preconfigured resource information or transmission resource pool information,
wherein the SPS resource information comprises at least one of: service type indication information, resource pool priority indication information, or timer expiry threshold;
wherein the preconfigured resource information comprises at least one of:
resource period, resource subframe offset, resource frequency domain indicator, resource frequency domain configuration index, resource time domain indicator, resource time domain configuration index, transmitting power configuration information, resource pool priority indication information, preconfigured resource identification information, or timer expiry threshold;
wherein the transmission resource pool information comprises at least one of: service type indication information, resource pool priority indication information, or timer expiry threshold;

wherein the method further comprises:
reporting resource request information for specific service data; and
reporting resource release request information for specific service data;
wherein the method further comprises:
receiving a shortest time threshold for state transition transmitted by a base station, the shortest time threshold being used to indicate, to the UE, a shortest time interval between activation of a resource for transmitting specific service data and release of the resource for transmitting specific service data.

22. The method according to claim 21, further comprising:
activating a resource for transmitting specific service data after receiving activation information; or
releasing a resource for transmitting specific service data after receiving release information.

23. The method according to claim 22, wherein activating the resource for transmitting specific service data comprises:
receiving resource activation signaling, which comprises:
scrambling a physical downlink control channel via a Radio Network Temporary Identifier (RNTI) so as to indicate activation of the resource; or
scrambling a physical downlink control channel via an SPS resource RNTI to activate an SPS resource, and receiving indication information for indicating activation of the SPS resource.

24. The method according to claim 22, wherein releasing the resource for transmitting specific service data comprises:
receiving resource release signaling, which comprises:
scrambling a physical downlink control channel via an RNTI so as to indicate release of the resource; or
scrambling a physical downlink control channel via an SPS resource Cell Radio Network Temporary Identifier (C-RNTI) to activate an SPS resource, and receiving indication information for indicating release of the SPS resource.

25. A resource allocation device, comprising:
a memory storing processor-executable instructions; and
a processor arranged to execute the stored processor-executable instructions to perform steps of the resource allocation method according to claim 15.

* * * * *